I. KNAPP.
WIRE FENCE.
No. 43,032  Patented June 7, 1864.
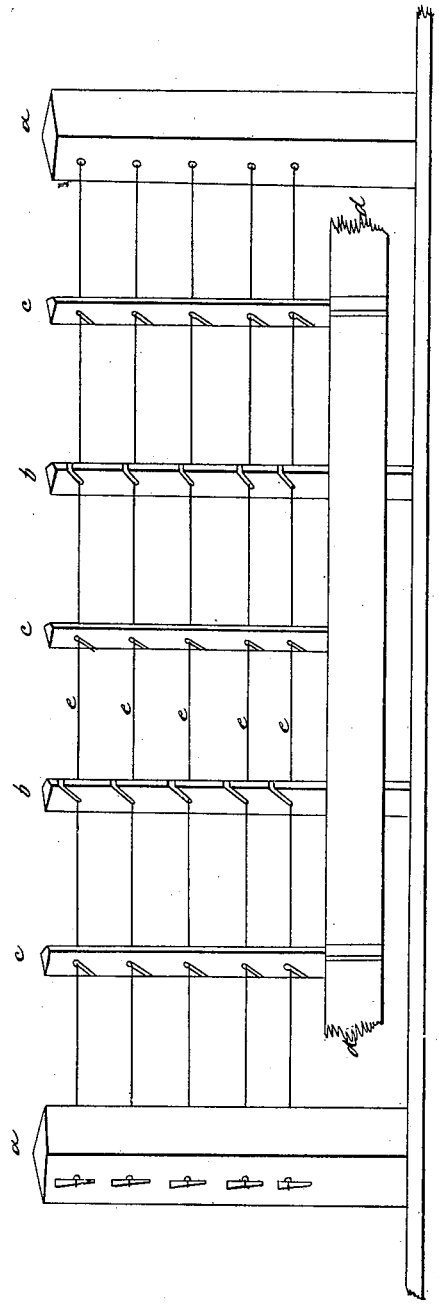
Witnesses.
Adna Bowen
G. N. Wilkinson
Inventor
Isaac Knapp

UNITED STATES PATENT OFFICE.

ISAAC KNAPP, OF MEDINA, NEW YORK.

IMPROVEMENT IN WIRE FENCES.

Specification forming part of Letters Patent No. 43,032, dated June 7, 1864.

*To all whom it may concern:*

Be it known that I, ISAAC KNAPP, of the village of Medina, in the county of Orleans and State of New York, have invented or produced a new and useful Improvement in Wire Fences; and I do hereby declare that the following is a full and exact description of the same.

At suitable distances I have what I term "permanent posts," either firmly set into the ground or otherwise strongly and substantially affixed thereto. At such spaces between the permanent posts as may be deemed advisable I have small posts, which I term "temporary posts," either inserted into the ground or firmly attached thereto, to give strength and permanency to the fence. Then, at suitable distances intervening the posts, both permanent and temporary, I attach perpendicular cleats or strips of lumber to the wires, by means of suitable cuts or openings made therein which, when attached, hang suspended by the wires of the fence, the said wires being attached to the posts and affixed thereto, and drawn at suitable distances apart and rising one above the other on a line parallel with the ground along and upon which the fence is being constructed. The said cleats or strips of wood or other material, when attached as aforesaid, are to extend a sufficient distance below the lowest wire in the fence, so that there can be attached thereto a bottom or base board, which is to form a portion of the fence and to be affixed to said cleats only.

What I claim as my invention, and desire to secure by Letters Patent, is—

The perpendicular cleats suspended to the wires of the fence with the base-board attached thereto, which will at all times keep the wires of the fence at a suitable tension by rising and falling with the contraction and expansion of the wires as they are affected by the weather.

ISAAC KNAPP.

Witnesses:
 G. N. WILKINSON,
 ADNA BOWEN.